United States Patent
Jang et al.

(10) Patent No.: US 9,766,613 B2
(45) Date of Patent: Sep. 19, 2017

(54) METHOD FOR SETTING UP WORK PIECE BASED ON VISION

(71) Applicant: DOOSAN INFRACORE CO., LTD., Incheon (KR)

(72) Inventors: Gye Bong Jang, Gyeonggi-do (KR); Dong Hwan Kim, Gyeonggi-do (KR)

(73) Assignee: Doosan Machine Tools Co., Ltd., Gyeongsangnam-do (KR)

( * ) Notice: Subject to any disclaimer, the term of this patent is extended or adjusted under 35 U.S.C. 154(b) by 454 days.

(21) Appl. No.: 14/374,794

(22) PCT Filed: Jan. 23, 2013

(86) PCT No.: PCT/KR2013/000528
§ 371 (c)(1),
(2) Date: Jul. 25, 2014

(87) PCT Pub. No.: WO2013/111964
PCT Pub. Date: Aug. 1, 2013

(65) Prior Publication Data
US 2015/0039119 A1 Feb. 5, 2015

(30) Foreign Application Priority Data
Jan. 26, 2012 (KR) .................. 10-2012-0007713

(51) Int. Cl.
*B23Q 17/22* (2006.01)
*G05B 19/402* (2006.01)
(Continued)

(52) U.S. Cl.
CPC ....... *G05B 19/402* (2013.01); *B23Q 17/2233* (2013.01); *B23Q 17/249* (2013.01);
(Continued)

(58) Field of Classification Search
None
See application file for complete search history.

(56) References Cited

U.S. PATENT DOCUMENTS 5,558,784 A * 9/1996 Obrist ................. B23H 7/04
219/69.12
5,815,400 A * 9/1998 Hirai .................. G05B 19/401
700/173
(Continued)

FOREIGN PATENT DOCUMENTS

DE 69913106 T2 8/2004
EP 2369434 A1 9/2011
(Continued)

OTHER PUBLICATIONS

Search Report dated May 9, 2013 and written in Korean with English translation for International Patent Application No. PCT/KR/2013/000528 filed Jan. 23, 2013, 5 pages.
(Continued)

*Primary Examiner* — Isaac T Tecklu
(74) *Attorney, Agent, or Firm* — John D. Veldhuis-Kroeze; Westman, Champlin & Koehler, P.A.

(57) ABSTRACT

According to an exemplary embodiment of the present disclosure, a method of setting up a work piece based on a vision is present. The method of setting up a work piece based on a vision comprises: calculating a start point of a work piece from the image of a work piece within a vision screen formed by a camera; capturing an image when a tool is captured in the vision screen; and calculating an offset value of the tool from the captured image.

10 Claims, 3 Drawing Sheets

(51) Int. Cl.
  *B23Q 17/24* (2006.01)
  *G05B 19/401* (2006.01)
(52) U.S. Cl.
  CPC ..... *B23Q 17/2428* (2013.01); *G05B 19/4015* (2013.01); *G05B 2219/37002* (2013.01); *G05B 2219/37555* (2013.01); *G05B 2219/37559* (2013.01); *G05B 2219/50294* (2013.01); *Y02P 90/265* (2015.11)

(56) References Cited

U.S. PATENT DOCUMENTS

| | | | | |
|---|---|---|---|---|
| 6,205,636 | B1* | 3/2001 | Abe | G05B 19/401 29/407.1 |
| 7,679,757 | B1* | 3/2010 | Harris | G01B 11/245 356/602 |
| 2002/0045968 | A1* | 4/2002 | Nakamura | G05B 19/4068 700/182 |
| 2003/0088337 | A1* | 5/2003 | Watanabe | G06T 7/74 700/259 |
| 2009/0059242 | A1* | 3/2009 | Fujieda | G01B 11/0691 356/625 |
| 2009/0071024 | A1* | 3/2009 | Strack | G01B 5/061 33/504 |
| 2009/0262976 | A1* | 10/2009 | Huang | G01B 11/002 382/103 |
| 2010/0063617 | A1* | 3/2010 | Mori | B23Q 17/20 700/175 |
| 2010/0111630 | A1* | 5/2010 | Yamagishi | B23Q 17/2233 409/131 |
| 2010/0201803 | A1* | 8/2010 | Melikian | B23K 9/32 348/90 |
| 2010/0244762 | A1* | 9/2010 | Mori | B23Q 17/22 318/632 |
| 2011/0228050 | A1* | 9/2011 | Wang | G05B 19/4015 348/46 |

FOREIGN PATENT DOCUMENTS

| | | |
|---|---|---|
| JP | H09-300178 A | 11/1997 |
| JP | H10-138100 A | 5/1998 |
| JP | 10-286746 | 10/1998 |
| JP | 2003-205440 | 7/2003 |
| JP | 2008-264954 | 11/2008 |
| JP | 2010-179373 | 8/2010 |
| KR | 10-1013749 | 2/2011 |

OTHER PUBLICATIONS

European Search Report mailed Jun. 3, 2016 for European Application No. 13741366.2, 16 pages.
European Search Report dated Jun. 14, 2017 for European Application No. 13741366.2, 6 pages.

* cited by examiner

METHOD FOR SETTING UP WORK PIECE BASED ON VISION

CROSS-REFERENCE TO RELATED APPLICATION

This Application is a Section 371 National Stage Application of International Application No. PCT/KR2013/000528, filed Jan. 23, 2014 and published, not in English, as WO 2013/111964 on Aug. 1, 2013.

FIELD OF THE DISCLOSURE

The present disclosure relates to a method of setting up a work piece based on a vision.

BACKGROUND OF THE DISCLOSURE

A computerized numerical control (CNC) machine tool refers to a machine for making a work piece according to electromechanical data created with an NC program. The NC program is software capable of creating working route data of a machine tool, which is called a "G code", with a drawing produced by a 2D or 3D CAD program.

A computer storing the data produced by the NC program is connected with the CNC machine tool, and the NC data is transmitted to the CNC machine tool, so that the CNC machine tool is operated according to the NC data.

A work piece setting-up operation is first performed before the operation of the CNC machine tool, and the work piece setting-up operation determines a start point of a work piece and an offset value of a tool.

In the work piece setting-up operation in the related art, an operator directly and manually moves a work piece and a tool, and sets up the work piece by using a setting-up option apparatus (Q-setter) and a probe. Further, an operator manually inputs a work piece setting-up value into the CNC machine tool.

The setting-up of the work piece needs to be frequently performed due to a change in the work piece and a tool according to a characteristic of the machine tool, and since the work piece setting-up operation is manually performed, time is consumed according to a frequent change in the work piece. A time according to the setting-up of the work piece occupies 50% of the entire process. Further, when an unskillful operator sets up the work piece, more time is consumed.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Some embodiments of the present disclosure are conceived to solve one or more of the aforementioned problems, and an object of some embodiments of the present disclosure can be to provide a method of setting up a work piece based on a vision, which is capable of reducing a setup time.

Another object of some embodiments of the present disclosure can be to provide a method of setting up a work piece based on a vision, which enables an unskilled operator to easily set up a work piece to improve efficiency of an operation.

To this end, according to an exemplary embodiment of the present disclosure, there is provided a method of setting up a work piece based on a vision, which is capable of automatically setting up the work piece by photographing the work piece and a tool by using a camera, image-processing images of the work piece and the tool, and calculating a start point of the work piece and an offset value of the tool.

Here, the calculation of the offset of the tool may mean a process of checking a change in a length, a diameter, and the like of the tool due to a change, abrasion, and the like of the tool, and performing correction of the length and the diameter of the tool. For example, coordinates of a turret fixing the tool may be calculated as mechanical coordinates, but a length of the tool fixed by the turret is different depending on a tool, and also mechanical coordinates of a tool blade may be changed according to a degree of abrasion of the tool blade even though the tools are the same as each other, so that it is necessary to correct the change in the mechanical coordinates. Accordingly, a correction operation of calculating accurate coordinates of the tool blade, that is, an operation point, by combining the coordinates of the turret and the coordinates of the tool blade is demanded, and the correction operation is defined as an offset.

Particularly, a method of working a work piece based on a vision according to an exemplary embodiment of the present disclosure may include: calculating a reference point of the work piece from an image of the work piece within a vision screen formed by a camera; re-setting the calculated reference point as an operation start point; and performing working according to a preset processing design based on the reset start point as a reference.

The re-setting of the calculated reference point as the operation start point may include: calculating pixel coordinates for the calculated reference point of the work piece; and calculating pixel coordinates of the operation start point by using the pixel coordinates for the reference point of the work piece.

The calculating of the pixel coordinates of the operation start point may include: calculating a distance per pixel by using a scaler attached to the work piece; and calculating pixel coordinates of the operation start point from a distance difference between the reference point of the work piece and the operation start point based on the pixel coordinates for the reference point of the work piece and the distance per pixel.

The calculating of the pixel coordinates of the operation start point from the distance difference between the reference point of the work piece and the operation start point may include: calculating the distance from the reference point of the work piece to the operation start point as first pixel displacement coordinates by using the distance per pixel; and calculating pixel coordinates of the operation start point by adding the pixel coordinates for the reference point of the work piece and the first pixel displacement coordinates.

The performing of the working may include: detecting a position of an end point of a tool when the tool is captured in the vision screen; calculating an offset value of the tool by using a distance between the start point of the work piece and the position of the end point of the tool; obtaining corrected coordinates of the tool by applying the offset; and performing the working based on the re-set start point and the corrected coordinates of the tool.

The calculating of the offset value of the tool may include: calculating the distance between the start point of the work piece and the position of the end point of the tool; and calculating the offset value of the tool by using the calculated distance and a distance per pixel.

The calculating of the offset value of the tool may include: calculating a distance between the start point of the work piece and the position of the end point of the tool as second pixel displacement coordinates by using the distance per pixel; and calculating pixel coordinates of the position of the end point of the tool by adding the second pixel displacement coordinates to the pixel coordinates of the start point.

A method of working a work piece based on a vision according to another exemplary embodiment of the present disclosure comprises: calculating a reference point of the work piece from an image of the work piece within a vision screen formed by a camera; re-setting the calculated reference point as an operation start point; capturing an image when the tool is captured in the vision screen; obtaining corrected mechanical coordinates of the tool by applying an offset calculated by using screen coordinates of the tool calculated from the captured image; and performing working according to a predefined processing design based on the reset operation start point and the corrected mechanical coordinates.

The calculated reference point as the operation start point may include: calculating pixel coordinates for the calculated reference point of the work piece; and calculating pixel coordinates of the operation start point by using the pixel coordinates for the reference point of the work piece.

The calculating of the pixel coordinates of the operation start point by using the pixel coordinates for the reference point of the work piece may include: calculating a distance per pixel by using a scaler attached to the work piece; and calculating pixel coordinates of the operation start point from a distance difference between the reference point of the work piece and the operation start point based on the pixel coordinates for the reference point of the work piece and the distance per pixel.

The calculating of the pixel coordinates of the operation start point from the distance difference between the reference point of the work piece and the operation start point may include: calculating the distance from the reference point of the work piece to the operation start point as first pixel displacement coordinates by using the distance per pixel; and calculating pixel coordinates of the operation start point by adding the pixel coordinates for the reference point of the work piece and the first pixel displacement coordinates.

The offset of the tool may be calculated by using: detecting a position of the end point of the tool; calculating a distance between the start point of the work piece and the position of the end point of the tool as pixel displacement coordinates by using the distance per pixel; and calculating pixel coordinates of the position of the end point of the tool by adding the pixel displacement coordinates to the pixel coordinates of the start point.

As described above, according to the present disclosure, it is possible to automatically set up a work piece by calculating a start point of the work piece and an offset value of a tool from images of the work piece and the tool photographed by a camera, thereby reducing a setup time.

Further, according to the present disclosure, the setting-up of the work piece is automatically performed without intervention by an operator, so that even though an operator unskilled in the setting-up of the work piece performs an operation, it is possible to improve efficiency of the operation.

DETAILED DESCRIPTION

Hereinafter, an exemplary embodiment of the present disclosure will be described in detail with reference to the accompanying drawings. Particular and specific matters described below are provided for helping general understanding of the present disclosure. In the following description of the exemplary embodiment, a detailed description of known configurations or functions incorporated herein will be omitted when it is determined that the detailed description may unnecessarily make the subject matter of the present disclosure unclear.

Figure 1:
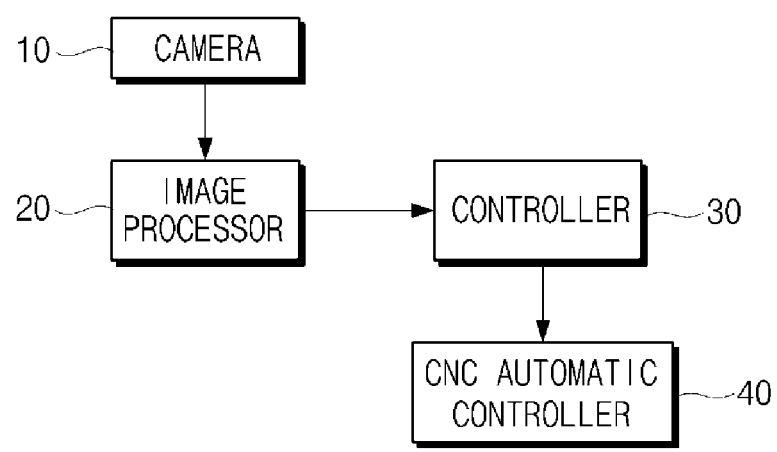
FIG. 1 is a schematic diagram illustrating an apparatus for setting-up a work piece based on a vision according to an exemplary embodiment of the present disclosure.

FIG. 1 is a schematic diagram illustrating an apparatus for setting-up a work piece based on a vision according to an exemplary embodiment of the present disclosure.

Referring to FIG. 1, an apparatus for setting-up a work piece based on a vision includes a camera 10, an image processor 20, a controller 30, a CNC automatic controller 40, and the like.

The camera 10 photographs a work piece laid on a machine tool and a tool working the work piece, and generates images of the work piece and the tool. A vision screen in which the work piece and the tool are viewed is formed by the camera 10.

The image processor 20 performs image processing on an entire image viewed on the vision screen and recognizes the work piece and the tool.

The controller 30 receives an image-processed image from the image processor 20. The controller 30 calculates a start point of the work piece from the work piece image, and calculates an offset value of the tool from the tool image. Here, the calculation of the offset of the tool may mean a process of checking a change in a length, a diameter, and the like of the tool due to a change, abrasion, and the like of the tool, and performing correction of the length and the diameter of the tool.

The process of setting up the work piece by the controller 30 will be described with reference to the flowchart of FIG. 2 in detail.

The CNC automatic controller 40 is a part for automatically controlling an operation of the machine tool. The CNC automatic controller 40 receives the start point of the work piece and the offset value of the tool from the controller 30, completes the setting-up of the work piece, and then controls the tool according to G code data input by an operator to perform working on the work piece.

The reason of the setting-up of the work piece by receiving the offset value will be described below. First, there is a coordinate system used on the screen obtained from the image processor 20, and further, a mechanical coordinate system for controlling a position of the tool is separately present. However, a reference point of the coordinate system on the screen is continuously changed according to a position of the work piece, so that a correlation between the mechanical coordinate system and the reference point needs to be calculated whenever the operation is performed.

The reference point of the work piece refers to a reference point of the work piece at which the operation is started, and a specific part of the work piece may be designated as the reference point by the operator through a program. For example, the work piece may set outermost parts of an X-axis and a Y-axis, and the outermost parts may be parts close to the tool.

When a screen coordinate of a tool blade is set, it is necessary to correct the screen coordinate of the tool blade, that is, convert the screen coordinate to a mechanical coordinate, and notify a system of the mechanical coordinate. The system processes the work piece according to a programmed process design by using the mechanical coordinate of the tool blade and the mechanical coordinate of the reference point of the tool.

Figure 2:
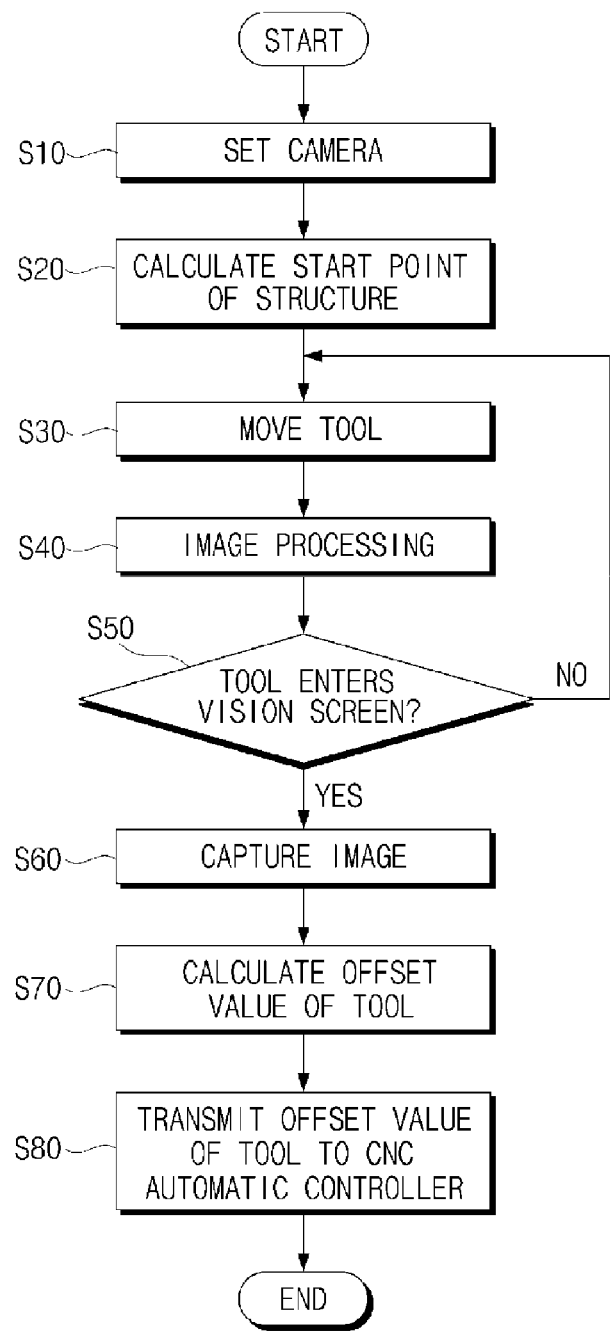
FIG. 2 is a flowchart illustrating a process for setting-up a work piece based on a vision according to an exemplary embodiment of the present disclosure.

FIG. 2 is a flowchart illustrating a process for setting-up a work piece based on a vision according to an exemplary embodiment of the present disclosure.

Referring to FIG. 2, first, a position and an angle of the camera are set so that a work piece is viewed on a vision screen formed by the camera (S10).

The controller 30 calculates a start point of the work piece from a work piece image viewed in the vision screen (S20). A process of calculating the start point of the work piece will be described in detail.

Figure 3:
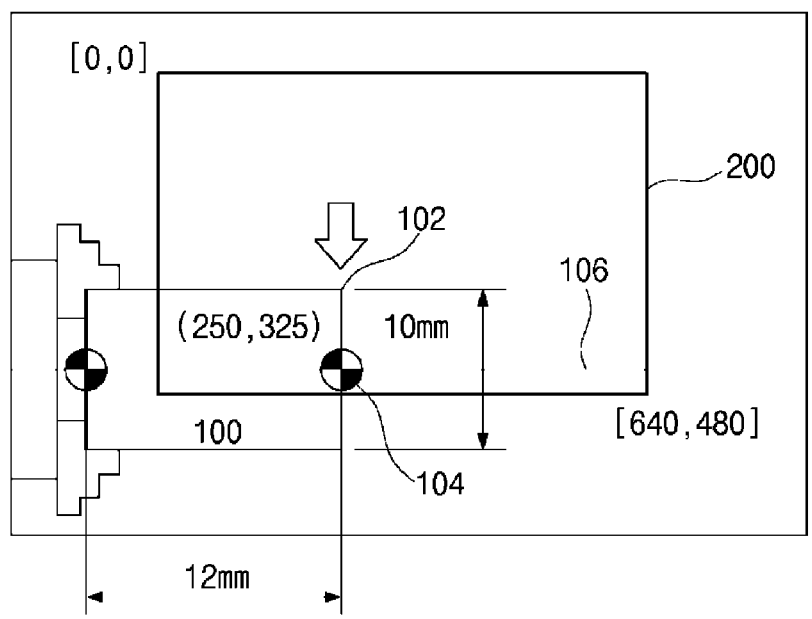
FIG. 3 is a diagram illustrating a screen when calculating a start point of a work piece during the setting-up of the work piece based on a vision according to an exemplary embodiment of the present disclosure.

FIG. 3 is a diagram illustrating a screen when calculating a start point of a work piece during the setting-up of the work piece based on a vision according to an exemplary embodiment of the present disclosure.

Referring FIG. 3, it can be seen that a work piece 100 is partially viewed on a vision screen 200 formed by the camera 10. Resolution of the vision screen 200 is 640×480 pixels, and a size of the work piece 100 is 12 mm×10 mm.

The controller 30 detects a reference point 102 of the work piece, and calculates pixel coordinates of the reference point. The pixel coordinates of the reference point are (250, 325).

Next, the controller 30 calculates a distance per pixel by using a scaler, which is the gradation attached to the work piece 100. The distance per pixel is, for example, 0.05 mm. That is, the distance per pixel is 0.05 mm/pixel.

The controller 30 searches for an operation start point based on a position of the reference point of the work piece. Here, a center part of the work piece 100 may be an operation start point 104. When the operation start point 104 is determined, the controller 30 marks a start point line (guide cross line) 106 on the work piece 100.

When it is assumed that a distance between the reference point 102 and the operation start point 104 is 5 mm, and pixel coordinates at the reference point are (0, 0), pixel coordinates at the start point is (0.5 mm/0.05 mm)=(0, 100). The pixel coordinates of the start point based on the reference point are first pixel displacement coordinates.

When the first pixel displacement coordinates (0, 100) are added to the pixel coordinates (250, 325) of the reference point, the pixel coordinates of the start point of the work piece are (250, 425). As described above, the start point of the work piece is calculated by calculating the pixel coordinates of the start point of the work piece.

After the start point of the work piece is calculated, the operator sets a type of the tool, and sends a tool 300 to a position of the start point. The tool 300 starts to move from the position of the start point (S30). First, the tool 300 is rapidly transferred from the start point to a center point, and is slowly transferred from the center point.

The image processor 20 continuously processes the image viewed on the vision screen 200 formed by the camera 10 along with the feeding of the tool (S40), and transmits the processed image to the controller 30. The controller 30 confirms whether the tool 300 enters the vision screen 200 (S50).

When the tool 300 does not enter the vision screen 200, the tool is continuously transferred, and when the tool 300 is captured in the vision screen 200, the transference of the tool is stopped, and the image in the vision screen is captured (S60).

The controller 30 calculates an offset value of the tool from the captured image (S70). A process of calculating the offset value of the tool will be described in detail.

Figure 4:
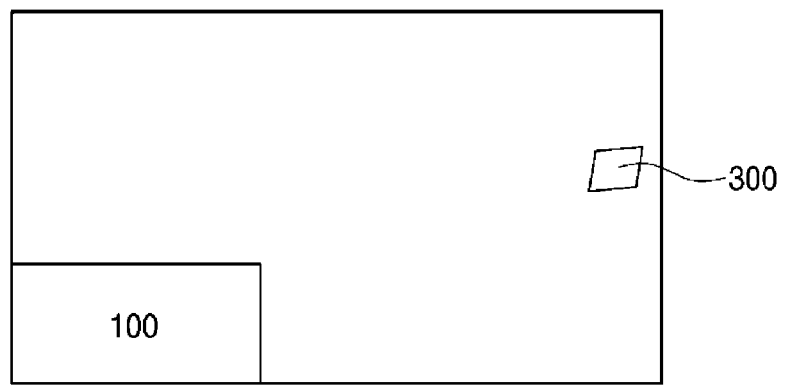
FIG. 4 is a diagram illustrating a screen when calculating an offset of a tool during the setting-up of the work piece based on the vision according to an exemplary embodiment of the present disclosure.

FIG. 4 is a diagram illustrating a screen when calculating an offset of the tool during the setting-up of the work piece based on a vision according to an exemplary embodiment of the present disclosure.

Referring to FIG. 4, the controller 30 recognizes the tool 300 in the captured image of the vision image, and detects a position of an end point of the tool.

An error of the position of the end point of the tool may be generated by an angle of the camera 10 and micro vibration of the tool. When a pixel angle of the camera is large, the position of the end point of the tool may be different, so that the end point of the tool may be detected by calculating an average of end point values of the tool measured at three point regions.

Further, an error of about one pixel may be generated by the micro vibration of the tool, so that a value calculated by measuring the image of the tool 10 times and averaging the measured images of the tool may be detected as the end point of the tool.

When the position of the end point of the tool is detected as described above, a distance between the start point 104 of the work piece and a position of the end point of the tool is calculated. Next, a distance between the start point of the work piece and the end point of the tool is calculated as second pixel displacement coordinates by using the distance per pixel. That is, when it is assumed that the pixel coordinates of the start point of the work piece is (0, 0), pixel coordinates of the end point of the tool are calculated.

The controller 30 calculates the pixel coordinates corresponding to the position of the end point of the tool by adding the calculated second pixel displacement coordinates to the pixel coordinates of the start point of the work piece to calculate the offset value of the tool. Here, the calculation of the offset of the tool may mean a process of checking a change in a length, a diameter, and the like of the tool due to a change, abrasion, and the like of the tool, and performing correction of the length and the diameter of the tool.

When the offset value of the tool is calculated, the controller 30 transmits the offset value of the tool to the CNC automatic controller 40 (S80). The CNC automatic controller 40 receives the offset value of the tool, completes the setting-up of the tool, and then starts the working for the work piece according to G code data.

The exemplary embodiments of the present disclosure have been described with reference to the accompanying drawings, but those skilled in the art will understand that the present disclosure may be implemented in another specific form without changing the technical spirit or an essential feature thereof.

Therefore, these above-described embodiments are provided or full understanding of the scope of the present disclosure by those skilled in the art, so that it should be understood that the embodiments are only for illustrative purposes in all aspects and is not limited, and the present disclosure is only defined by the accompanying claims.

The invention claimed is:

1. A method of working a work piece based on a vision, comprising:
    calculating a reference point of the work piece from an image of the work piece within a vision screen formed by a camera;
    re-setting the calculated reference point as an operation start point; and
    performing working according to a preset processing design based on the reset start point as a reference, wherein the performing of the working comprises:
    detecting a position of an end point of a tool when the tool is captured in the vision screen;
    calculating an offset value of the tool by using a distance between the start point of the work piece and the position of the end point of the tool; obtaining corrected coordinates of the tool by applying the offset; and performing the working based on the re-set start point and the corrected coordinates of the tool.

2. The method of claim 1, wherein the re-setting of the calculated reference point as the operation start point comprises:
    calculating pixel coordinates for the calculated reference point of the work piece; and
    calculating pixel coordinates of the operation start point by using the pixel coordinates for the reference point of the work piece.

3. The method of claim 2, wherein the calculating of the pixel coordinates of the operation start point comprises:
    calculating a distance per pixel by using a scaler attached to the work piece; and
    calculating pixel coordinates of the operation start point from a distance difference between the reference point of the work piece and the operation start point based on the pixel coordinates for the reference point of the work piece and the distance per pixel.

4. The method of claim 2, wherein the calculating of the pixel coordinates of the operation start point from the distance difference between the reference point of the work piece and the operation start point comprises:
    calculating the distance from the reference point of the work piece to the operation start point as first pixel displacement coordinates by using the distance per pixel; and
    calculating pixel coordinates of the operation start point by adding the pixel coordinates for the reference point of the work piece and the first pixel displacement coordinates.

5. The method of claim 1, wherein the calculating of the offset value of the tool comprises:
    calculating the distance between the start point of the work piece and the position of the end point of the tool; and
    calculating the offset value of the tool by using the calculated distance and a distance per pixel.

6. The method of claim 5, wherein the calculating of the offset value of the tool comprises:
    calculating a distance between the start point of the work piece and the position of the end point of the tool as second pixel displacement coordinates by using the distance per pixel; and
    calculating pixel coordinates of the position of the end point of the tool by adding the second pixel displacement coordinates to the pixel coordinates of the start point.

7. A method of working a work piece based on a vision, comprising:
    calculating a reference point of the work piece from an image of the work piece within a vision screen formed by a camera;
    re-setting the calculated reference point as an operation start point;
    capturing an image when a tool is captured in the vision screen;
    obtaining corrected mechanical coordinates of the tool by applying an offset calculated by using screen coordinates of the tool calculated from the captured image; and
    performing working according to a predefined processing design based on the reset operation start point and the corrected mechanical coordinates, wherein the offset of the tool is calculated by using:
    detecting a position of an end point of the tool;
    calculating a distance between a start point of the work piece and the position of the end point of the tool as pixel displacement coordinates by using the distance per pixel; and
    calculating pixel coordinates of the position of the end point of the tool by adding the pixel displacement coordinates to the pixel coordinates of the start point.

8. The method of claim 7, wherein calculating the reference point as the operation start point comprises:
    calculating pixel coordinates for the calculated reference point of the work piece; and
    calculating pixel coordinates of the operation start point by using the pixel coordinates for the reference point of the work piece.

9. The method of claim 8, wherein calculating the pixel coordinates of the operation start point by using the pixel coordinates for the reference point of the work piece comprises:
    calculating a distance per pixel by using a scaler attached to the work piece; and
    calculating pixel coordinates of the operation start point from a distance difference between the reference point of the work piece and the operation start point based on the pixel coordinates for the reference point of the work piece and the distance per pixel.

10. The method of claim 9, wherein calculating pixel coordinates of the operation start point from the distance difference between the reference point of the work piece and the operation start point comprises:
    calculating the distance from the reference point of the work piece to the operation start point as first pixel displacement coordinates by using the distance per pixel; and
    calculating pixel coordinates of the operation start point by adding the pixel coordinates for the reference point of the work piece and the first pixel displacement coordinates.

* * * * *